Fig. 6
Fig. 7
Fig. 8

INVENTORS
LYLE MARSH
GABRIEL MALKIN
BY
WILSON, LEWIS & McRAE

Jan. 2, 1962 L. MARSH ETAL 3,015,415
MIXING AND DISPENSING APPARATUS
Filed Feb. 25, 1960 8 Sheets-Sheet 7

Fig. 9

INVENTORS
LYLE MARSH
BY GABRIEL MALKIN
WILSON, LEWIS & McRAE

INVENTORS
LYLE MARSH
GABRIEL MALKIN
BY
WILSON, LEWIS & McRAE 3,015,415
MIXING AND DISPENSING APPARATUS
Lyle Marsh, St. Clair Shores, Mich., and Gabriel Malkin, Westfield, N.J., assignors to Marien Metal Products Co., Hazel Park, Mich., a corporation of Michigan, and Benjamin Moore & Co., New York, N.Y., a corporation of New Jersey
Filed Feb. 25, 1960, Ser. No. 10,950
4 Claims. (Cl. 222—14)

The present invention relates to liquid proportioning and dispensing apparatus, and more particularly to a device of this character in which an adjustable predetermined total quantity of liquid may be dispensed, the total quantity comprising different liquids individually dispensed in adjustable predetermined proportions.

The apparatus of the present invention is particularly adapted for use in dispensing the base colorants used in the preparation of mixed-to-order coating compositions. The base colorants used in such coating compositions consist of pigment mixed with sufficient vehicle to form a flowable mass. The liquid mixture may be termed "viscous." It should be noted at this point that while the dispenser is described in relation to the dispensing of colorants, it will be appreciated that it is also operable to dispense a variety of liquids, such, for example, as liquid or semi-liquid food products, lubricating oils or various other products having a paste-like consistency.

Mixed-to-order paints are prepared on the spot by paint retailers to supply each customer's individual requirements. Mixed-to-order paints make available a wide variety of standardized and special colors and hues, in comparison to the limited range of pre-mixed colors available from paint manufacturers, and at the same time permit the retailer to inventory only a small number of different base colorants. The advantages of this method of paint retailing have created a strong demand for devices capable of efficiently dispensing base colorants.

Various attempts have heretofore been made to provide dispensing apparatus suitable for use in retail outlets. Several problems have been encountered in the provision of such devices, such as extreme complexity of the units, cumbersomeness, and cost. In addition, there have been certain problems inherent in paint mixing which have been difficult to overcome. In order to produce and reproduce the exact hues desired, it is necessary that the dispensing device be extremely accurate. A small error in the amount of colorant dispensed may result in an appreciable deviation between the actual paint mixed and the color desired. Such devices should be adjustable to dispense either a small or a large amount of a specific colorant. For example, the device should be able to automatically dispense as little as $\frac{1}{500}$ of an ounce or as much as 8 ounces, depending upon the requirements of the particular paint being formulated. Additionally, the dispenser should be of rugged and long-lasting construction and should be inexpensive to manufacture. It is also desirable that the dispenser not have objectionable drippings of colorant after the dispensing operation which would create a clean-up problem.

Accordingly, it is an object of this invention to provide a liquid dispensing apparatus of the proportioning type.

Another object of the invention is to provide dispensing apparatus which is adjustable to permit dispensing of different liquids individually in predetermined amounts to produce a total predetermined quantity of liquid.

A further object of the invention is to provide a novel liquid dispensing pump for the apparatus which will accurately dispense a predetermined amount of liquid upon each actuation thereof.

Another object of the invention is to provide means for varying the amounts dispensed from the pump in accordance with the requirements of the particular formulation.

A still further object of the invention is to provide a pump for the dispensing apparatus which is "drip free" after each dispensing operation.

Another object of the invention is to provide a storage means to carry a quantity of liquid for each pump and to provide agitator means to keep the stored liquid in a well-mixed condition.

An additional object is to provide means to prime the pump to insure that no air is entrapped in the pump metering chamber.

Another object of the invention is to provide a plurality of such pumps mounted on a rotatable turntable provided with interlock means whereby the different pumps carrying the various liquids may each be selectively positioned in dispensing relation to a container as desired, and to then be connected to means for varying the amounts dispensed and also to power means for operating the pump.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGS. 1 through 4, it may be seen that the dispensing apparatus 10 comprises a base 12 upon which is mounted a rotatable turntable 14. The turntable 14 carries a plurality of pumps 16 each of which has a liquid storage reservoir 18. The base 12 carries a motor 20 for driving the various pumps 16. An electrical control circuit 22 is mounted in housing 24 projecting outwardly from the base 12. In addition, the base 12 is provided with an adjustable shelf 26 to accommodate different sized containers to collect material dispensed from the apparatus. Interlock means 28 are also mounted on the base 12.

The basic operation of the dispensing apparatus is quite simple. The turntable 14, which carries a variety of different base colorants, is manually rotated to position the desired colorant supply reservoir over the adjustable shelf 26 and to position the pump 16 associated with the particular reservoir in operative relation with the pump motor 20. The interlock 28 is provided to release the turntable for such rotation and to concurrently disconnect the pump motor and electrical control mechanism from electrical power. When the turntable has been properly positioned, the interlock is adapted to re-establish the electrical connections and to hold the turntable in the desired position.

When the turntable has been positioned, the amount of colorant to be dispensed is selected by means of an indexing mechanism and the dispensing operation is initiated by depressing the dispense button 32. The proper amount of colorant will be dispensed and the dispensing action will automatically stop as soon as the dispensing cycle is complete.

Figure 2:
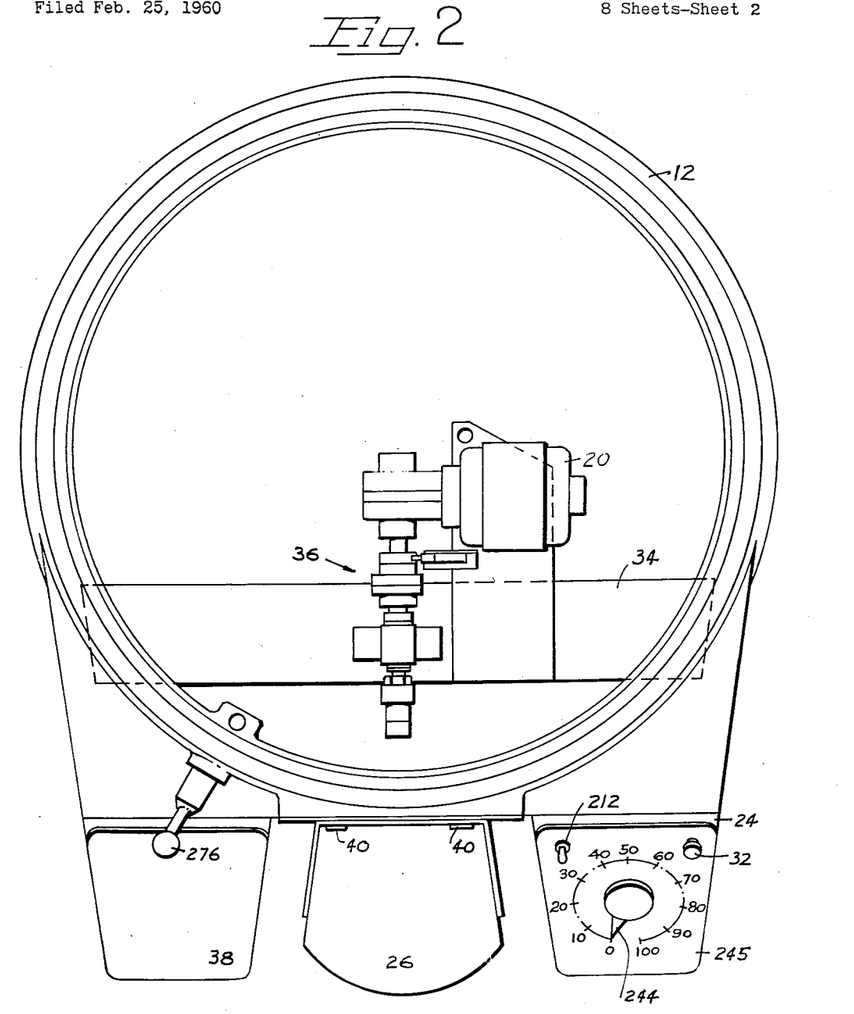
FIG. 2 is a top plan view of the base of the apparatus shown in FIG. 1, the turntable being removed.

Referring more specifically to the drawings, it can be seen in FIG. 2 that the base 12 comprises an open-top cylindrical member. The base is preferably an aluminum casting. Mounted on platform 34 provided within the base, is the pump motor 20 which has a shaft assembly 36. An outwardly projecting housing 24 is provided on the exterior of the base 12. As previously mentioned, the housing 24 contains most of the components of the electromechanical counting device. For the purpose of symmetry, a second dummy housing 38 is also provided on the base. Mounted between the housings 24, 38 is the adjustable shelf 26.

The shelf 26 is secured to the base by a pair of screws 40 when the apparatus is to dispense into small containers, such as quarts. A second set of screws 42 is provided beneath the screws 40 to permit securing of the shelf at a lower level to fill larger cans, such as gallons. In order to remove the shelf for moving from one set of screws to the other, the screws are loosened, the shelf raised from the position shown whereby the head of the screws will move from the narrow slot openings 44 to the enlarged slots 46 to permit disengagement therewith. The reverse procedure is used to remount the shelf. The machine may also be used to dispense in even larger cans by removing the shelf altogether and mounting the cans on a support beneath the machine.

Figure 3:
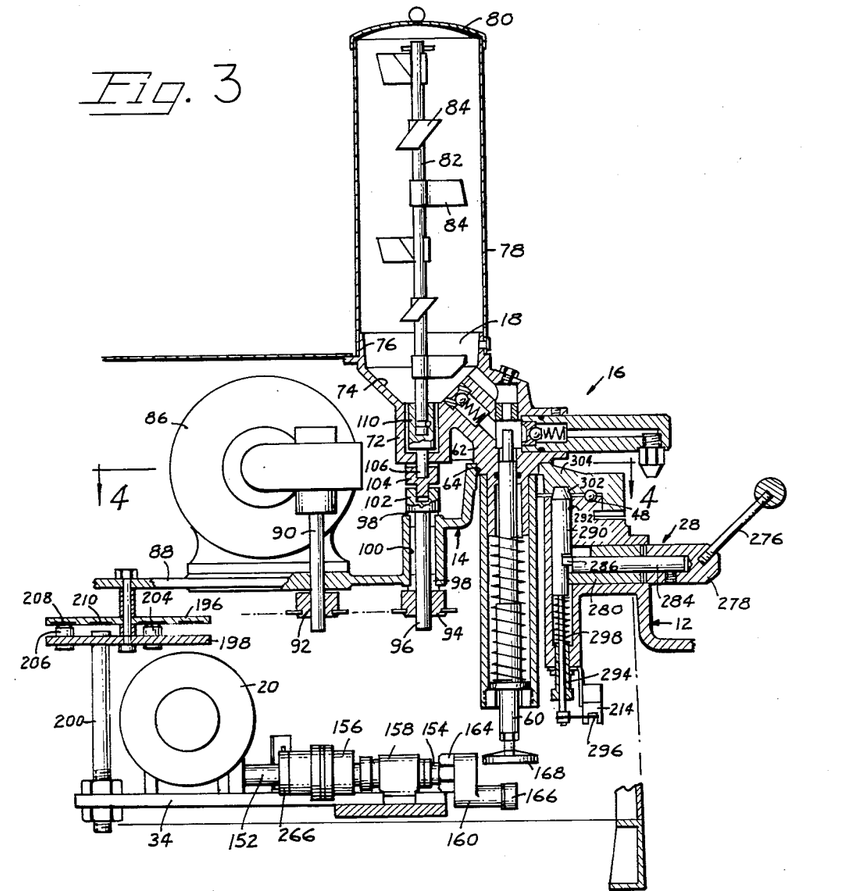
FIG. 3 is a side elevational view of the apparatus of FIG. 1 sectioned through one of the pumps.

As may be seen in FIG. 3, the turntable 14, which is also circular, is rotatably mounted on the base 12 by means of bearings 48 which are retained in races provided on the base and turntable.

Figure 1:
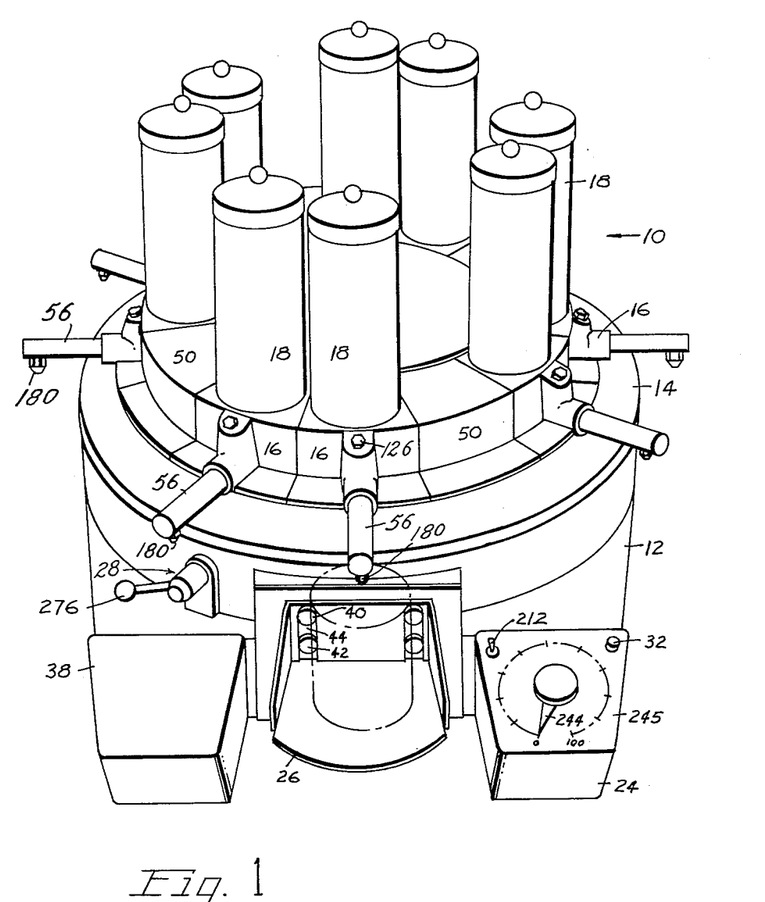
FIG. 1 is a perspective view of an embodiment of the dispensing apparatus of the present invention.

As may be seen in FIGS. 1 and 3, the turntable carries a plurality of dispensing pumps 16 and associated liquid reservoirs 18. As shown, there are eight such units to accommodate an eight colorant system. In the embodiment shown, there is room for four additional dispensing pumps. Such additional pumps could be mounted by removing dummy covers 50 and securing the pumps in the available space. However, it is to be noted that the number of such pumps is not restricted to any particular amount, it being possible to construct the dispenser apparatus with more or fewer pumps than are shown.

The liquid storage reservoirs 18 are in fluid communication with a metering chamber 52 of each pump 16. The chamber 52 is provided with an outlet opening 54 having a spout 56 which is normally releasably closed by check valve means 58. A cyclically operated multi-stroke plunger 60 is provided for insertion into the metering chamber 52. The plunger 60 is operable on one stroke to first close the chamber 52 to the reservoir 18 and to trap a metered quantity of liquid therein, and to subsequently displace and expel a predetermined quantity of the trapped fluid through the outlet 54. The plunger 60 is operable on the return stroke to open the chamber 52 and permit liquid to feed from the reservoir 18 to fill chamber 52 for the next dispensing cycle.

Figure 5:
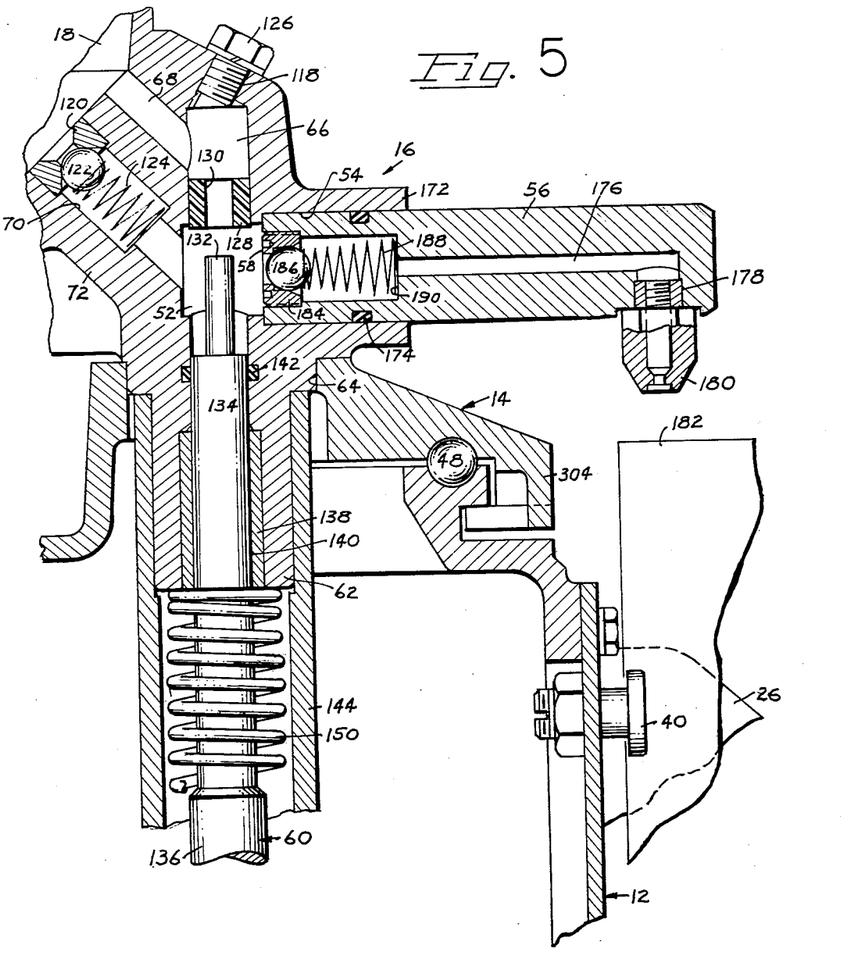
FIG. 5 is an enlarged sectional view of the metering portion of the pump of FIG. 3.

Referring more specifically to FIGS. 3 and 5, the pump casing 62 is supported within an opening 64 in the turntable 14. The casing 62 is formed with a vertical axial passageway 66, a portion of which defines the metering chamber 52. Extending into the upper portion of the passageway 66 are a pair of spaced downwardly inclined lateral passageways 68, 70 formed in an angular projection portion 72 of the pump casing. The passageways 68, 70 each act as fluid inlets through the metering chamber 52 and in addition serve in a special cooperating function when the pump is primed as will be hereinafter more fully explained. The projecting portion 72 is provided with a conically shaped well portion 74 which forms a part of the fluid reservoir. The upper rim of the well 74 is provided with an upstanding peripheral flange 76 to receive an open-ended tube 78 which cooperates with the well 74 to form the reservoir. A removable lid 80 is provided on the upper end of the tube 78.

Figure 4:
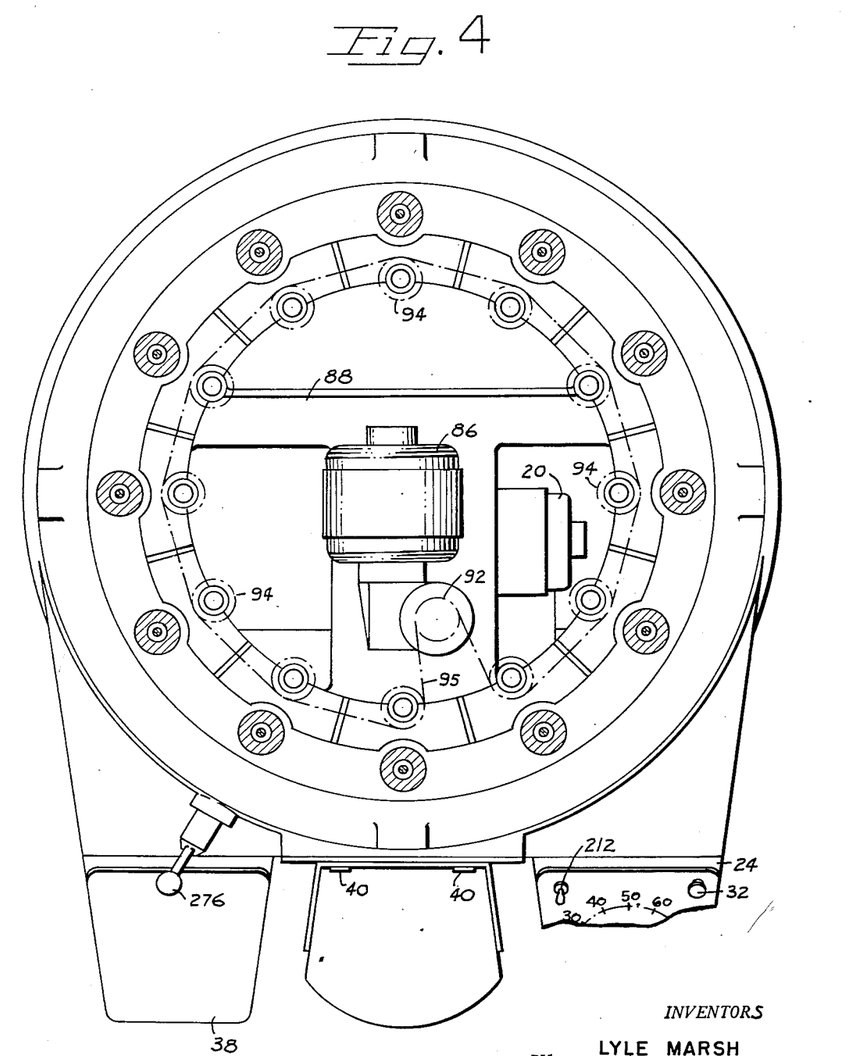
FIG. 4 is a top plan view of the dispensing apparatus taken substantially along the line 4—4 of FIG. 3 looking in the direction of the arrows.

Positioned within the reservoir are agitator means for keeping the liquid stored therein in a well-mixed condition. The agitator comprises a vertical shaft 82 extending axially through the reservoir. Secured to the shaft 82 are a plurality of vertically spaced blades 84 to give a stirring action when the shaft is rotated. It is not necessary to continuously stir the liquid. Normally, it is stirred just prior to a dispensing operation to insure free flow into the pump. The agitator means is rotatably driven by means of an agitator motor 86 having a suitable power transmission connection to the lower end of the shaft 82. As may be seen in FIGS. 3 and 4, the motor 86 is mounted on a platform 88 which forms an integral part of the turntable structure 14. Extending downwardly from the motor 86 is its output shaft 90 which carries a chain sprocket 92 at the lower end thereof. The sprocket 92 is drivingly connected to a second sprocket 94 carried on the lower end of a sprocket shaft 96. The shaft 96 is journalled in suitable bearings 98 mounted in a bore 100 extending upwardly from the motor platform 88. The sprocket shaft is drivingly connected with the agitator shaft 82 by means of a female adapter 102 which meshes with a male adapter 104 carried on the lower end of stub shaft 106. The shaft 106 extends through an opening provided in the bottom of well 74 and is secured to the agitator shaft 82 by means of a connector 110. The connector 110 is journalled in its bore by means of suitable bearings. As shown in FIG. 4, each of the agitator shafts is provided with a sprocket 94 and all of these sprockets are interconnected to the sprocket 92 through the chain 95.

As previously mentioned, the inlet passageways 68, 70 are utilized in a cooperative manner to prime the pump. The purpose of priming the pump is to insure that metering chamber 52 and associated passageways are completely filled before pump operation. This requires the prevention of air entrapment in the metering chamber and associated passageways. Such entrapped air would lead to inaccuracies in the amount of liquid dispensed on each cycle.

The priming step involves the passageways 68, 70 and a priming opening 118. As may be noted, the passageway 70 is normally closed by means of a check valve comprising a valve seat 120, a spherical valve element 122 and a spring 124 which constantly urges the element 122 to seat in the valve seat 120. At one point in the priming operation, it is necessary to open the check valve and to close the upper passageway 68. A useful tool for this purpose is a rod having at its lower end a pair of spaced fingers for insertion into the passageways 68, 70. Such a rod may be completely inserted into the reservoir 18 through the upper end thereof. One finger will be of sufficient size to block the passageway 68 while the other will be small enough to be inserted into the passageway 70 to push the ball 122 out of the way but not block the passageway 70 to the flow of fluid.

There are two alternate methods for priming the pump. One method consists of first removing the primer plug 126, then manually depressing the valve element 122 to open the passageway 70, and blocking the passageway 68 which may be done with a tool as described. Fluid may then be delivered to the metering chamber 52 through the priming opening 118. As the level of liquid rises, any air which is trapped in the metering chamber 52 is forced out through the passageway 70. When the level of liquid has risen above the metering chamber 52 and passageway 68, the valve element 122 may be released to close the passageway 70 and the passageway 68 may be unblocked. Continuing the rise in the fluid level forces any air in the upper portion of the passageway 66 out through the passageway 68. It is desirable to fill the pump to the uppermost point in th priming opening 118 so that when the threaded plug 126 is screwed into the opening it will immediately contact liquid without entrapping any air at that point.

The alternative method of pump priming, which is essentially the reverse of the above-described method, is to deliver fluid through priming opening 118 before the passageway 68 is blocked and the passageway 70 is opened. Using this technique, the upper portion of the passageway 66 and the passageway 68 are first filled without the entrapment of air. After this has been accomplished, the passageway 68 is blocked and the passageway 70 opened as previously described. Continued pouring through the opening 118 will then cause the passageway 70 and metering chamber 52 to be filled.

Wall means are provided to extend across the passageway 66 to define the metering chamber 52. The wall means comprise a bushing 128 having a central opening 130. During the dispensing cycle of the pump, the opening 130 is closed by a valve element 132 carried by the plunger 60 whereby a quantity of liquid is trapped in the metering chamber 52. A portion of the trapped liquid is subsequently dispensed through the outlet 54.

The plunger 60 is a generally cylindrical rod element comprising at its upper end a first reduced diameter portion which forms the valve element 132, followed by an intermediate portion 134 of increased diameter which forms the fluid-displacing element, and terminating at its lower end in a portion 136. The intermediate portion 134 is journalled by means of a suitable bearing 138 in a bore 140 provided in casing 62. An oil seal such as an O-ring 142 is provided in the bore 140 adjacent the metering chamber 152 to prevent leakage from the chamber. The plunger 60 is surrounded by a sleeve 144 which is secured at its upper end to the casing 62.

Figure 6:
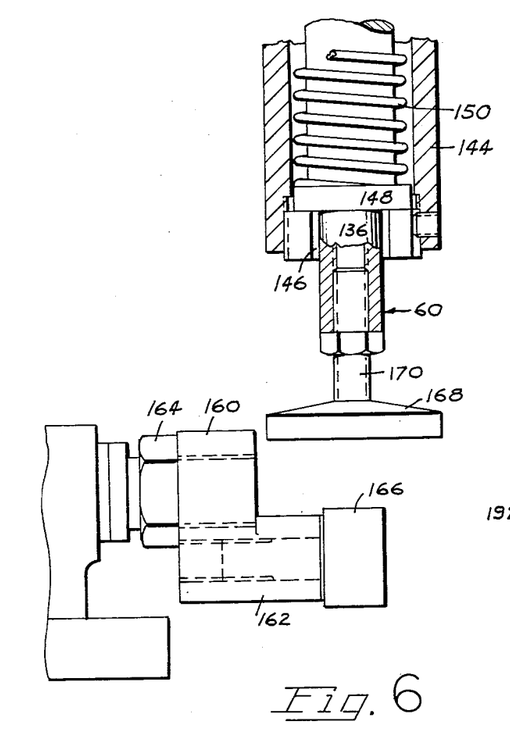
FIG. 6 is an enlarged sectional view of the lower portion of the FIG. 3 pump showing the drive means for the pump plunger.

As may be seen in FIG. 6, the lower end of the sleeve 144 is provided with bearings 146 in which is journalled the lower end 136 of the plunger. A collar 148 is provided adjacent the lower end of the plunger to act as a stop member to limit the downward stroke of the plunger. The collar 148 also acts as a guide member to maintain the plunger in axial alignment.

The plunger is vertically reciprocated by means of a compression spring 150 and the pump motor 20. The spring 150 is provided in the sleeve 144 with its upper end abutting against the casing 62 and its lower end abutting against the collar 148. The spring 150 constantly urges the plunger toward its lowermost position. The plunger is driven on its upward stroke by means of a cam or crank arrangement rotatably driven by the motor 20. The output shaft 152 of the motor is coupled to a cam shaft 154 by means of a flexible coupling 156. The cam shaft is journalled in suitable bearings 158. Secured to the outer end of the cam shaft is a cam element 160 having an arm 162 projecting outwardly to a point beneath the plunger 60. As will be appreciated, when the turntable 14 is rotated to a new position to dispense a different color the cam shaft will be positioned beneath the plunger 20 of the new pump so as to be in operative relationship therewith for a dispensing action.

The cam element 160 is locked in place on the shaft 154 by means of a jam nut 164. Secured to the outer end of the arm 162 is a rotatable cylindrical element 166, which may be considered to be a cam follower. The element 166 is adapted to contact the cam follower plate 168, provided at the lower end of the plunger 60, and drive the plunger in its upward stroke. The cam follower plate is adjustably secured to the plunger 60 by means of a threaded stud 170. This permits the point of contact of the rotatable element 166 with the follower 168 to be adjusted by screwing the stud 170 in or out of the plunger. In this way, the length of the plunger stroke may be varied to vary the amount metered from the pump upon each actuation thereof.

In operation of the plunger drive system, the motor 20 rotates the cam element 160 causing the element 166 to contact the follower 168 and drive the plunger in an upward stroke. The element 166, will, of course, contact the follower 168 during a portion only of a circular path. When the plunger has reached the limits of its upward stroke, the spring 150 urges it downwardly to its lower position to complete the dispensing cycle.

The upward stroke of the plunger 60 does not act to dispense liquid from the pump until the valve element 132 closes the opening 130. Prior to closing of the opening 130, fluid displaced by the plunger 60 will be forced through the opening 130 and back into the reservoir 18 since the check valve 58 will maintain the spout 56 closed. After the opening 130 is sealed, continued upward movement of the plunger will operate to create sufficient pressure to open the check valve 58 and dispense fluid through the spout. A requirement of such displacement-type dispensing action is that after the opening 130 is closed, an increased volume of the plunger be introduced into the metering chamber. In the preferred embodiment, this is accomplished by providing the valve element 132 as a reduced section whereby as portions of the valve element slide through the bushing 128 and leave the metering chamber, the larger diameter portion 134 of the plunger enters the metering chamber to provide the necessary displacing volume. However, a similar action could be accomplished in other ways, for example by providing the valve element mounted on a compressible spring or as a telescoping element to slide into the upper portion of the plunger 60.

When the plunger ends its upward stroke, the pressure in the chamber 52 drops and the check valve 58 closes to discontinue dispensing liquid through the opening 64. During the downward stroke, the valve element 132 creates a suction to draw liquid from the reservoir 18 through the passageway 68 to immediately fill the upper portion of the passageway 66. Simultaneously therewith, a suction is created in the chamber 52 to unseat the check valve element 122 and open the passageway 70 to begin refilling the chamber 52. When the element 132 passes entirely through the opening 130, fluid will be drawn through both or either of the passageways 68, 70 to fill the chamber 52. This arrangement provides a very rapid refill procedure to permit the pump to be driven at high speed. The outlet spout 56 is secured to an annular projection 172. An O-ring 174 is provided to prevent leakage of liquid around the spout. The spout has a central passageway 176 leading from the inner end to a point adjacent the outer end thereof. A threaded vertical passageway 178 leads at right angles from the outer end of the passageway 176 to form the spout outlet. The outlet is provided with nozzle 180 to direct the dispensed liquid into a paint container 182. The container 182 is supported on the adjustable shelf 26.

Figure 7:
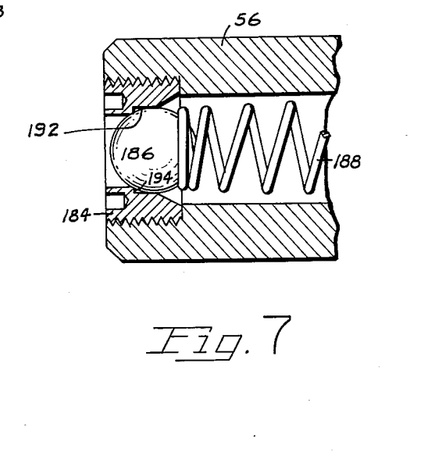
FIG. 7 is an enlarged view in section of the spout valve structure of the pump of FIG. 3.

The outlet check valve 58, which comprises a valve seat 184, spherical valve element 186, and conical spring 188, is mounted in an enlarged portion 190 of the passageway 176. In addition to releasably opening and closing the spout 56 to allow flow of liquid through each dispensing cycle, the check valve 58 operates to quickly cut off the flow of liquid from the spout after dispensing and also to prevent dripping of liquid thereafter. This is accomplished as a result of the suction which the spherical element 186 creates as it moves to close the opening 64. As may be noted in FIG. 7, the valve seat 184 is provided with a passageway 192, adjacent the annular seating surface 194, for the reception of the ball 186. The diameter of the passageway 192 is substantially equal to the major diameter of the ball 186, there being a small clearance to permit ball movement. Movement of the ball through the passageway 192, towards the surface 194, creates the aforementioned suction. The suction is of sufficient magnitude to draw liquid remaining in the passageway 176 towards the inner end of the spout, thus providing a quick shut-off of flow from the pump. It is important to have the liquid drawn back from the spout in order to compensate for variation of room temperature which may cause thermal expansion with a consequent dripping of the trapped fluid. The distance which the liquid is withdrawn may be varied as desired by varying the length of the passageway 192 or by varying both the diameter of passageway 192 and ball 186. The fluid is retained in the spout during the non-dispensing period either by the surface tension of the fluid or the differential pressure created by the suction. Due to the high viscosity and impermeability of most of the liquids dispensed from the pump, there is a high surface tension within the fluid and also a considerable length of time before air passes therethrough to equalize the pressure on both sides of the trapped fluid. In the event that the pump is to be used for a thin liquid, the spout may be inclined at a slight upward angle to retain fluid trapped therein.

Figure 8:
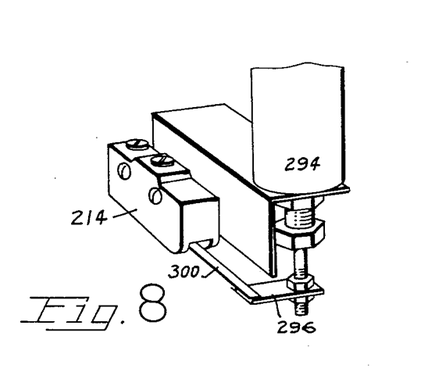
FIG. 8 is a view of a switch mechanism associated with interlock means provided for the dispensing apparatus.
Figure 9:
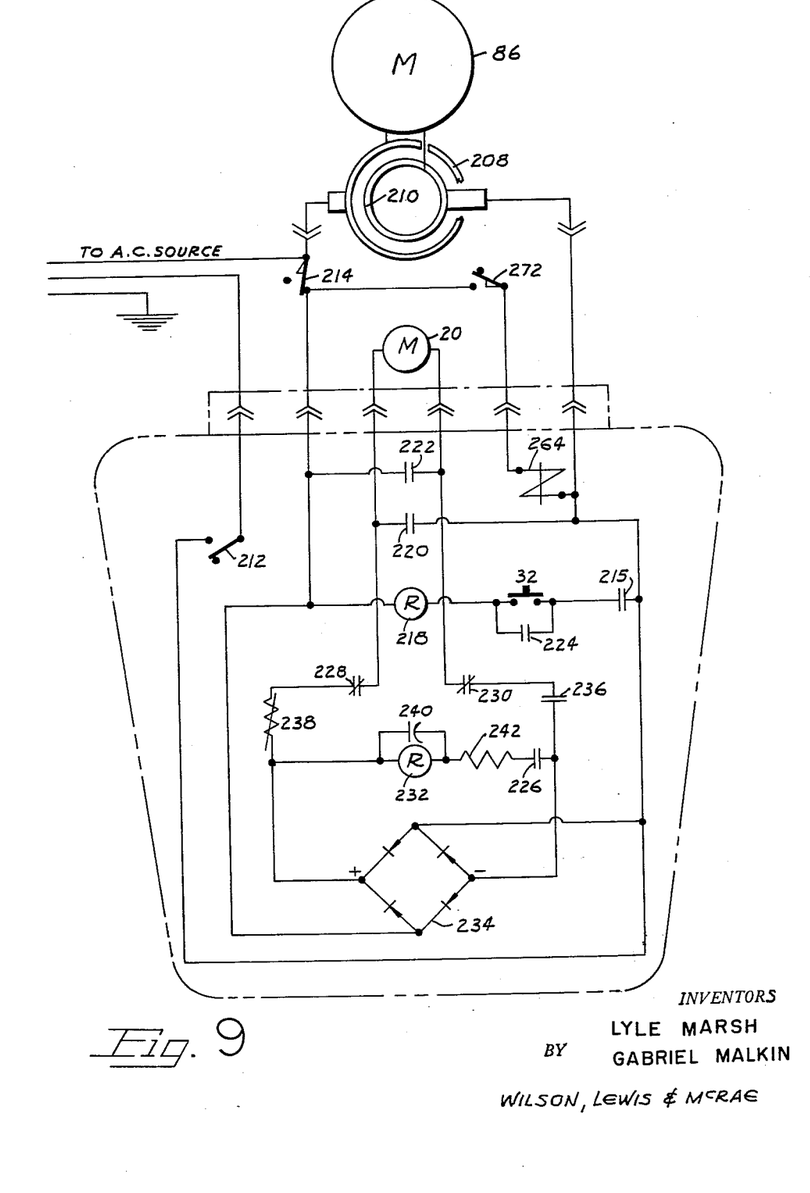
FIG. 9 is a schematic diagram of an embodiment of the electro-mechanical control system for the apparatus.
Figure 10:
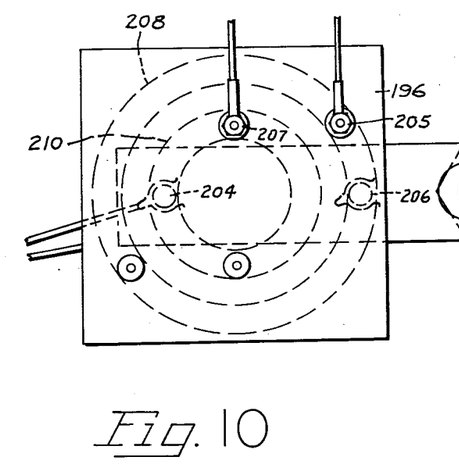
FIG. 10 is a top plan view of an embodiment of slip ring apparatus utilized to connect the agitator motor with electrical power.

The amount of fluid dispensed from the pump 60 during one dispensing operation is readily controlled by controlling the number of revolutions of the motor 20. The electro-mechanical counter system for accomplishing this is illustrated in the schematic diagram of FIG. 9. The associated mechanical components of the system are illustrated in FIGS. 3, 8, 10, 11 and 12. Referring to FIG. 9, it may be noted that the portion of the circuit enclosed within the phantom lines is contained within the housing 24 of the base 12. The circuit through the agitator motor 86 will be considered first. As will be noted in FIG. 3, the agitator motor 86 is carried on the turntable 14 and is rotatable therewith. Therefore, a slip ring construction has been provided to maintain electrical contact with the power source regardless of the position of the turntable. As shown in FIGS. 3 and 10, the slip ring construction comprises a pair of spaced plates 196, 198. The plates 196, 198 are fabricated of an insulating material. The lower plate 198 is fixedly mounted by means of rod 200 to the platform 34 of the pump motor. The upper plate 196 is mounted by means of rod 202 to the rotatable platform 88 of the agitator motor 86. The plates 196, 198 are positioned over the center of rotation of the turntable so that when the turntable is rotated, the upper plate 196 will not shift out of relationship with the lower plate. The lower plate 198 is provided with a pair of concentrically spaced contact lugs 204, 206. Each of the contact lugs has an electrical connection to one side of a source of A.C. power. A pair of concentric contact rings 208, 210 are embedded in the plate 196 and have a sliding contact with the lugs 204, 206. A lead runs from each terminal 205, 207 of the contact rings to the motor 86 to thus supply continuous power thereto.

As may be seen in FIG. 9, an agitator switch 212 is provided to permit starting or stopping of the agitator motor at will. Normally, the agitator motor will be turned on only when the liquid is to be dispensed. However, it may be desirable in some instances to mix the contents of the container at regular intervals regardless of whether or not dispensing is to take place.

Considering next the circuit through the pump motor 20, attention is directed to the fact that the electro-mechanical circuit will do three things to this motor. It will turn it on, turn it off after a predetermined number of revolutions, and brake it to a sudden stop when it is turned off. There are three conditions which must be met before the pump motor will start. The agitator switch 212 must be closed, the interlock switch 214 must be closed and the contacts 215 of counter contact switch 216 must be closed. If the aforementioned three conditions are met, depression of the dispense button 32 will operate to close the circuit through the pump motor to start it rotating and begin the dispensing operation.

A relay 218 is provided having normally open contacts 220, 222, 224, 226 and normally closed contacts 228, 230. Depression of the dispense button (assuming the three conditions are met as will be hereinafter explained) will operate to close the circuit through relay 218 and consequently to close the open contacts and open the closed contacts. Closing contacts 220, 222 closes the circuit to the pump motor to start it in operation. Closing of the contacts 224 permits the dispense button to be released while still maintaining a circuit through the relay 218. Closing contact 226 completes D.C. circuit to a second relay 232. Relay 232 is then operated by D.C. rectifier 234 to cause normally open contacts 236 of this to close. The function of the D.C. circuit is to apply a D.C. current to the pump motor when dispensing is to be discontinued. The D.C. current will act as a brake to stop the rotation of the pump motor immediately. During operation of the pump motor, the circuit through the rectifier 234 is open as far as the pump motor is concerned because the normally closed contacts 228, 230 of relay 218 are open during this period. However, when the circuit is broken through relay 218, these contacs will close thus completing a circuit comprising the rectifier and the pump motor. A resistance 238 is provided to limit the amount of D.C. applied to the motor.

It is of course apparent that when relay 218 is no longer supplied with power, its contacts 226 will open thus breaking the D.C. circuit through relay 232 and the rectifier 234. However, a capacitor 240 is provided in parallel with the relay 232 to hold the contacts 236 of this relay open for a short time after the direct circuit is broken. This timed delay, which is about one second, is sufficient to brake the motor to a stop. The capacitor 240 is of course charged up during operation of the rectifier 234 to supply the small amount of power necessary to keep the relay 232 in operation long enough to permit the braking action. A resistor 242 is provided in series with the relay 232 as a safety in limiting the initial charge of the capacitor 240.

As previously mentioned, the contacts 215 of counter contact switch 216 must be closed before the pump motor can be started. The counter contact switch is closed by indexing the counter mechanism 30. This is accomplished by turning the dial pointer 244, shown in FIG. 2, clockwise to the number on the index plate 245 indicating the desired number of "shots" to be dispensed. Turning of the dial pointer past the zero mark will act to close the counter contact switch 216.

Figure 12:
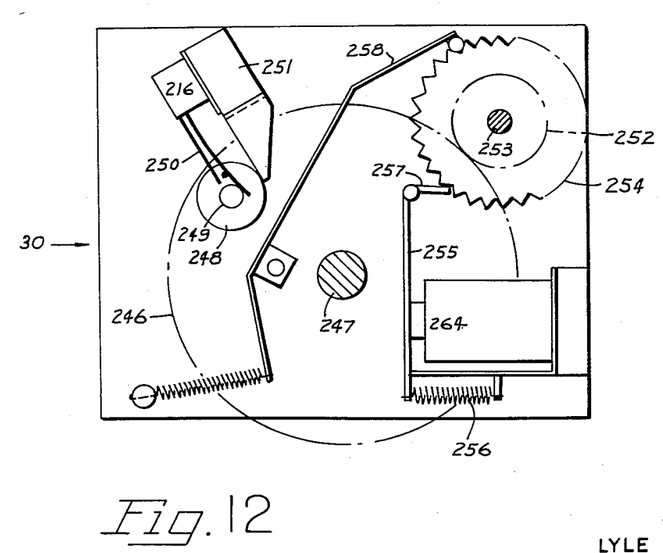
FIG. 12 is a view of the counter mechanism.

Closing of the switch 216 is accomplished by means shown in FIG. 12. A gear 246 is secured to the dial pointer shaft 247. The gear 246 has secured thereto a number 248 having a projecting portion 249. The projection 249 is adapted to actuate switch arm 250 to open switch 216 when the pointer is in the zero position as shown. Turning of the gear 246 away from this position will operate to permit switch arm 250 to spring into a position whereby the switch is closed. As will be noted, the member 248 acts as a stop member abutting against fixed stop 251 to limit rotation of the gear 246 past either the zero position or the maximum dispensing amount, shown as 100 shots.

The gear 246 is operatively connected to the counter mechanism 30 through the small gear 252. The gear 252 is fixed to the same shaft 253 as is ratchet wheel 254.

The ratchet wheel 254 is placed in operative relationship with a pawl 255 which is actuated by a counter actuating solenoid 264. Energization of the solenoid 264 is effective to cause the pawl 255 to advance he ratchet wheel 254 the distance of one tooth. This is equivalent to one rotation of the pump motor, and consequently to the dispensing of one "shot" from the pump. As will be noted, the pawl is provided with spring 256 to return it to its initial position upon de-energization of the solenoid. The ratchet driving member 257 of the pawl is pivotally mounted with a spring return so that it will slide over the ratchet teeth on its return movement to avoid driving the ratchet wheel in the opposite direction. The ratchet wheel is releasably locked in each position by spring driven detent member 258. The detent 258 is not of the positive locking type and permits the ratchet wheel to be driven in the opposite direction by the dial pointer to permit the initial indexing.

As will be appreciated, rotation of the ratchet wheel also rotates gear 246 through gear 252. When the gear 246 reaches the zero position, switch 216 will be opened, causing the dispensing operation to end. The number of teeth through which the ratchet wheel travels determines the total amount of material dispensed from the pump.

As previously mentioned. the contacts 215 of counter contact switch 216 must be closed before the pump motor can be started. The counter contact switch is tripped by the index valve 30 illustrated in FIG. 2. The dial pointer 244 is turned clockwise on the index plate to the number indicating the desired number of "shots" to be dispensed. Turning of the dial pointer past the zero mark will act to close the counter contact switch 216. This may be accomplished by means such as shown in FIG. 12. A cam 246 having a flat 248 is secured to the dial pointer shaft 250. As shown, the cam 246 is positioned in the zero location. Turning of the cam away from this position will operate to depress switch arm 252 of switch 254 to depress switch plunger 256 to close the counter contact.

Also attached to the shaft 250 may be a ratchet wheel 258. The ratchet wheel is placed in operative relationship with a pawl 260 secured to the plunger 262 of a counter actuating solenoid 264. Energization of the solenoid 264 is effective to move the ratchet wheel 258 the distance of one tooth. This is equivalent to one rotation of the pump motor, and consequently to the dispensing on one "shot" from the pump. Rotation of the ratchet wheel 258 also rotates the cam 246. When the cam 246 reaches the zero position, switch 216 will be opened, causing the dispensing operation to end. The number of teeth through which the ratchet wheel has to travel determines the amount of material dispensed from the pump.

Figure 11:
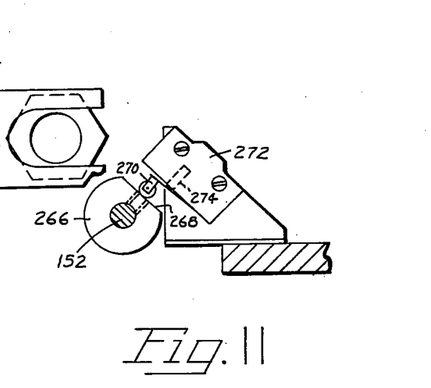
FIG. 11 is a side elevational view of the cam and switch arrangement associated with the pump motor shaft to count the number of revolutions of the shaft during each dispensing cycle.

As may be seen in FIGS. 3 and 11, the solenoid 264 is actuated by a cam-switch arrangement secured to the pump motor output shaft. The cam 266 is secured to the pump motor output shaft. A flat 268 is provided on the cam to actuate switch arm 270 of switch 272 upon each revolution of the pump shaft. Actuation of the arm 270 will depress switch plunger 274 to close the switch. The switch 272 is in the circuit of the solenoid 264 and operates, when closed, to energize the solenoid. Energization of the solenoid, will, as previously described, operate the counter mechanism.

The third condition which must be fulfilled before the apparatus will dispense is that the interlock switch 214 must be closed. As best seen in FIGS. 3 and 8, the interlock switch is operated by the interlock mechanism 28. The interlock provides an important safety feature in that dispensing cannot be begun until the turntable is positioned so that the cam element 166 is positioned below the follower plate 168 and is locked in this position. The interlock mechanism comprises a handle 276 which is secured to rotatable member 278. The member 278 is rotatably secured in bore 280 provided in the base 12. Fixedly secured within an axial bore of the rotatable member 278 is a rod 284. The rod 284 is provided at its inner end with an eccentrically mounted pin 286. The pin 286 projects into a slot provided on horizontal rod 290, which is slidably mounted in bore 292. The upper end of rod 290 is tapered as shown. A smaller diameter rod 294 projects downwardly from the lower end of rod 290 and carries at its lower end a vertically adjustable plate 296. A spring 298 is provided to constantly urge rod 290 upwardly. The plate 296 is positioned in operative relationship with switch arm 300 of interlock switch 214. When the rod 290 is depressed by action of the handle 276, switch arm 300 moves to a position to open the interlock switch. Conversely, when the plate 296 is moved upwardly, it will contact switch arm 300 and close the interlock switch.

As may be noted, a notch or recess 302 is provided on the underside of the peripheral portion 304 of turntable 14. One such notch is provided for each pump location. The notches are adapted to receive the tapered upper end of rod 290 to lock the turntable in dispensing position. The location of the notches is such that when the rod 290 is in engagement therewith, the follower plate 168 will be directly above the cam member 166.

In operation, when it is desired to rotate the turntable 14 to a new position, the handle 276 of the interlock is turned to the extreme left. Due to the configuration of the eccentric cam 286 and its angular relationship with the rod 290, it will lock in this position to permit free rotation of the turntable 14. Just prior to positionment of the desired pump over the adjustable shelf 26, the handle 276 is moved in the reverse direction, towards the right. The upper end of rod 290 will contact the surface of turntable portion 304 in a sliding contact. Continued rotation of the turntable 14 will position the rod 290 directly beneath the notch 302. The spring 298 will then force the rod 290 upwardly into engagement with the notch, resulting in locking in the turntable and closing the interlock switch 214 to permit dispensing.

The dispensing apparatus disclosed is, as may be readily appreciated, a relatively uncomplicated device. It is capable of long usage without failure and is of rugged construction. It is particularly characterized in its ability to deliver small quantities of liquid per stroke and yet to deliver a large number of strokes rapidly to facilitate dispensing of a large amount of liquid.

Having thus described our invention, we claim:

1. A dispensing device comprising a base; a turntable rotatably mounted thereon; a plurality of liquid supply means carried on the turntable; said turntable being rotatable to position a selected one of the supply means in dispensing relationship to a container; each of said liquid supply means including a pump for dispensing liquid therefrom; said pump comprising a metering chamber having an inlet and an outlet; said inlet communicating with the liquid supply; check valve means releasably closing said outlet; a plunger opening in said metering chamber; a plunger slidably received in the plunger opening; wall means extending across the metering chamber and separating the inlet opening from both the outlet opening and the plunger opening; an opening in said wall means for the passage of fluid therethrough; a valve element carried by the plunger operable on one stroke to close the wall opening and trap a metered quantity of liquid in the metering chamber and to subsequently displace and expel a predetermined quantity of liquid through the outlet; a single prime mover carried by the base to selectively actuate the pumps; said prime mover having a rotatable shaft carrying a cam mechanism; said cam mechanism being positioned in operative relationship to drive a pump plunger when said plunger's associated pump and liquid supply means are positioned in dispensing relationship to a container; and electro-mechanical control means for selectively predetermining the number of times the pump is actuated to vary the total quantity of liquid dispensed.

2. A device as claimed in claim 1 and further characterized in that said pump plunger is longitudinally adjustable to selectively vary the amount of liquid dispensed on each actuation of the pump.

3. Dispensing apparatus comprising a base; a turntable rotatably mounted thereon; a plurality of liquid supply means carried on the turntable; said turntable being rotatable to position a selected one of the supply means in dispensing relationship to a container; each of said liquid supply means including a pump for dispensing liquid therefrom; said pump comprising means defining a liquid metering chamber; said metering chamber having first and second inlets and an outlet; said first and second inlets communicating with the fluid supply; first check valve means releasably closing said second inlet; second check valve means releasably closing said outlet; a plunger opening in said metering chamber; a plunger slidably received in the plunger opening; wall means extending across the metering chamber and separating the first inlet opening from the second inlet opening, the outlet opening and the plunger opening; an opening in said wall means for the passage of fluid therethrough; and a valve element carried by the plunger to close the opening in the wall means; whereby the plunger is operable on one stroke to close the wall means opening and trap a metered quantity of liquid in the metering chamber and to subsequently displace and expel a predetermined quantity of liquid through the outlet and operable on the return stroke to create a suction to open the check valve means of the second opening and to draw liquid into the metering chamber; an electric motor in the dispenser base to selectively drive each of the pumps; said motor having an output shaft including a cam mechanism; said cam mechanism being positioned in operative relationship to drive a pump plunger when said plunger's associated pump and liquid supply means are positioned in dispensing relationship to a container; and electro-mechanical control means for selectively predetermining the number of times the pump is actuated to vary the total quantity of liquid dispensed; said control means including indexing means for selecting the number of times the pump is to be actuated; counter means to count the number of times the pump is actuated, and means to stop pump actuation after the preselected number of actuations.

4. Apparatus as claimed in claim 3 and further characterized in the provision of interlocking means operative to releasably lock the turntable against rotation; said interlocking means being operative to prevent pump actuation unless one of the supply means is locked by said interlocking means in dispensing relationship to a container.

References Cited in the file of this patent

UNITED STATES PATENTS

| | | |
|---|---|---|
| 2,326,359 | Humbert | Aug. 10, 1943 |
| 2,374,430 | Hexter | Apr. 24, 1945 |
| 2,787,402 | Stiner et al. | Apr. 2, 1957 |
| 2,923,438 | Logan et al. | Feb. 2, 1960 |

FOREIGN PATENTS

| | | |
|---|---|---|
| 100,751 | Australia | Apr. 22, 1937 |